Feb. 11, 1969  J. A. DYKEMA ET AL  3,427,095
SAFETY REARVIEW MIRROR WITH FLEXIBLE GLASS ADHERED
TO A FLEXIBLE BACKING SUPPORT
Filed March 11, 1965

INVENTORS
JAMES A. DYKEMA
ROGER D. JOHNSON
BY

ATTORNEYS

United States Patent Office 3,427,095
Patented Feb. 11, 1969

3,427,095
SAFETY REARVIEW MIRROR WITH FLEXIBLE
GLASS ADHERED TO A FLEXIBLE BACKING
SUPPORT
James A. Dykema and Roger D. Johnson, Holland, Mich.,
assignors to Donnelly Mirrors, Inc., Holland, Mich., a
corporation of Michigan
Continuation-in-part of application Ser. No. 252,751,
Jan. 21, 1963. This application Mar. 11, 1965, Ser.
No. 439,024
U.S. Cl. 350—288                                3 Claims
Int. Cl. G02b 7/18

ABSTRACT OF THE DISCLOSURE

A safety rearview mirror for vehicles constructed of a thin, flexible and bendable glass reflector adhesively secured over its entire back surface to a resilient, non-metallic support body, which is the sole support for the glass reflector. The support body is flexible and bendable and has sufficient retention capacity for the glass reflector to retain the fragments in the event the glass is broken.

---

This is a continuation-in-part of our copending application entitled, Shatter Resistant Mirror, filed Jan. 21, 1963, Ser. No. 252,751 now abandoned, and assigned to the assignee herein.

This invention relates to a new type of vehicular rearview mirror assembly, and more particularly relates to a new combination rearview mirror having tremendous capacity for variations in style and appearance, while simultaneously providing excellent safety characteristics greatly superior to those of conventional mirror assemblies.

Inside vehicular rearview mirrors normally comprise a plate of glass coated with a reflective coat, and secured within a die-formed, metallic shell crimped around the glass plate perihpery. The assembly projects into the automobile interior on a swivel bracket secured to the casing back, as by rivets. The metal back can only be varied in minor dimensions or degrees of curvature and still remain capable of being accurately fitted with the precision ground glass edge. Capacity for styling changes in extremely limited. More serious than these aesthetic considerations, however, are the serious safety problems raised by this conventional assembly. If the metal casing and the glass plate of the mirror remain intact and unbroken when impacted with a person's head in a vehicular collision, skull puncture is likely. If, on the other hand, the impacted end of the glass breaks, with resulting casing shell bending, the fragmented glass and bent edge of the metal shell causes severe lacerations of the head, face, and neck. In either instance therefore, severe head injury is likely.

It is an object of this invention to provide a completely unique, rearview mirror construction that is formed according to a concept that departs from that of the traditional mirror assembly construction, and by so doing, achieves a vastly superior and safer unit.

It is another object of this invention to provide a unique rearview mirror assembly that enables substantial impact without puncture or lacerations of the person's head, face, or neck. The mirror neither remains absolutely rigid with impact to cause a puncture, nor shatters in a disassembling manner to cause slashing. Rather the mirror assembly, as a unit, bends a substantial amount upon impact, even though normally completely sturdy and reliably oriented. It can bend a significant amount in a resilient non-breaking fashion. Furthermore, even if one end of the unit is so severely bent that the glass plate breaks, all of the glass pieces are retained in proper position on the unit rather than scattering. The primary object of this invention therefore is to provide a far safer mirror assembly than those now almost universally employed in vehicles.

Another object of this invention is to provide a safer mirror construction which also is adaptable to a great many variations in aesthetic appeal characteristics, enabling many considerations to be freely employed in the design and styling of the mirror. It is highly variable in coloring, backing configuration, back surface effects, and peripheral configuration.

These and several other objects of this invention will become apparent upon studying the following specification in conjunction with the drawings in which.

Figure 1:
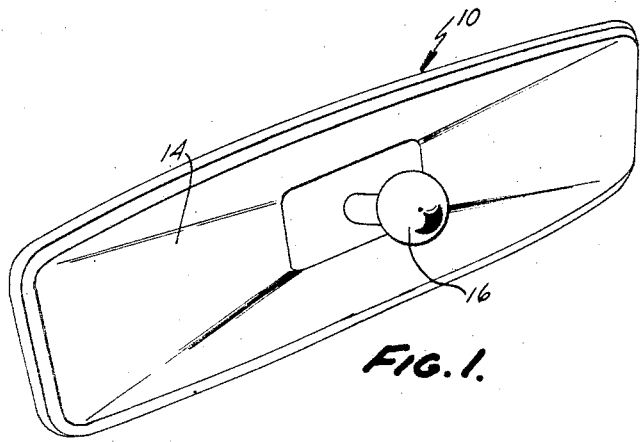
FIG. 1 is a perspective view of the back of one form of the novel mirror.
Figure 2:
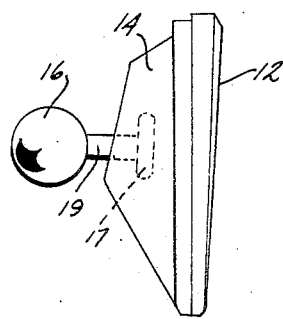
FIG. 2 is a side elevational view of the mirror in FIG. 1.
Figure 3:
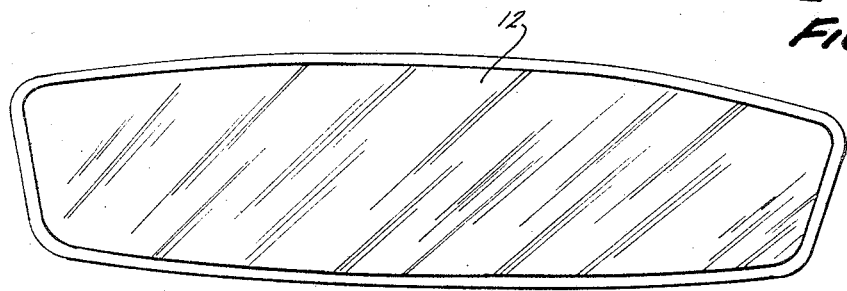
FIG. 3 is a front elevational view of the mirror in FIGS. 1 and 2.

Referring now specifically to the drawings, and mirror assembly 10 in FIGS. 1, 2 and 3 includes a reflective glass plate 12, a casing backing support 14 bonded thereto, and a mounting bracket 16 imbedded in the backing support.

The reflective glass plate 12 may be a front surface reflector or a second surface reflector, and/or may be a prismatic type unit. The reflective coating can be any of several conventionally used materials, for example silver covered with a protective coating of copper to prevent oxidation. The front face of the reflective glass plate is exposed to be a rearviewing means as shown in FIG. 3.

The glass plate is relatively thin, being about ⅛ inch or less in thickness. It has a high strength. It is capable of being bent through a substantial arc without breaking. The glass is preferably of the type formed by the Chemcor method. The glass is formed with surface layers under substantial compression, and with the interior portion under substantial tension, to provide strength that will prevent the glass from breaking or shattering even under substantial impact force. The glass is preferably made by having crystallized skin layers which are grown at a high temperature, having a negative thermal expansion to thus expand as they cool. The shrinking of the internal glass, which has a positive thermal expansion during forming, causes extremely high compression in the skin, resulting in high strength. As an example of the glass, it may be formed by employing surface nucleated crystallization of a lithia-alumina-silica glass. Alternatively, it may be formed of a sodium-alumina-titania-silica glass where the sodium ions in the surface are replaced with lithium ions by immersion in a high temperature molten lithium sulfate bath, to end up with titania-nucleated crystallization of eucryptite crystals at the surface of the glass.

When so made, the glass plate may be bent, as by impact deflection on one end, without breaking until a very large bending force is applied.

The tightly bonded polymeric backing 14 forms a body which, in cooperation with the glass plate, achieves the complete support and normal reflective stability of the mirror assembly when mounted. There is no metallic casing or shell employed. Rather, these two elements and a mounting bracket 16 form the assembly. The polymer is of substantial thickness. It may vary in thickness, however, from its top to bottom and/or end to end, as shown in FIG. 2. Any desired back surface pattern, peripheral configuration, thickness variation, and/or design and styling characteristics may be provided in the mirror construction. Variations in the back surface pattern may include wood grain simulations, geometric patterns, corrugations, fabric simulations, and the like, Design characteristic variations can include thin line style, gradations in corner curvature etc. Color variations can be employed to match or contrast with vehicle decor and/or surface pattern effects.

This polymeric material is preferably a polyvinyl material such as polyvinyl chloride and/or polyvinyl acetate. The polyvinyl materials are preferred since they retain their flexibility even at low sub-zero temperatures. The vinyl is normally in the form of a vinyl plastisol and preferably is bonded to the back of the mirror face by bonding agents due to the non-retentive qualities of polyvinyl materials to glass or metal. The bonding material or adhesive may be a primer of any conventional type normally used for bonding polyvinyl chloride to metal or glass, for example acrylates or polyepoxy resins or some other selected thermosetting or thermoplastic resin to achieve an irremovable bond and air tight seal between the polymer and the mirror plate back. Suitable plasticizers and/or stabilizing agents can be employed in the polymer to control its exact characteristics.

The polymeric backing must have a certain degree of resiliency and flexibility, so that with impact applied to one end of the mirror assembly, it will flex resiliently with the glass plate in an arc, rather than bending permanently and releasing the glass such as the normal metal shell casing does. The complete bonding of the mirror back face to the polymer achieves a retentive capacity so that, even if the glass plate does break into several pieces upon severe impact, it will not shatter. Rather, the pieces will be all held tightly in place on the polymer surface.

In use, if an impact force is applied to the mirror by a person's head in a vehicle, the mirror will not give one of the two extremes of conventional mirrors, i.e. either complete rigidity with smaller impact force, and complete disassembly and shattering with larger forces. During its normal usage, the combined polymer and glass plate have sufficient self-supporting body to provide excellent, dependable rearviewing. It will flex considerably, upon impact, to bend backwardly. This flexing normally prevents breaking of the glass under even substantial impact. If the glass does break, and the polymer bends further yet, the glass is retained in position in bonded relationship to the polymer to prevent shattering, slashing, jagged exposed glass edges, and the like which are normally encountered with rearview mirrors.

Instead of the polyvinyl materials mentioned above, various other polymers could be employed in copolymeric or monopolymeric relationship for the mirror assembly. These include cellulosic polymers, polyepoxies, polyfluoro carbons, polyesters, silicone polymers, polyethylenes, poly vinyl alcohol, poly acetal resins, poly carbonate resins, polypropylene, poly ureas, and conceivably others.

It has been found that a foam type material has particular advantages for this usage, for example, foamed polyvinyl chloride, since it retains its flexibility even at very low temperatures.

In this form of the invention shown in FIGS. 1, 2, and 3, the peripheral edge of the glass plates exposed, with the polymer terminating immediately behind it. This exposed glass edge has decorative aesthetic qualities, particularly when beveled as shown and claimed in copending application entitled, Mirror Construction, Ser. No. 431,921, filed Feb. 11, 1965.

The support bracket for the unit is of the swivel type. It is formed directly in cooperation with the polymeric backing. In the first form of the invention in FIGS. 1-3, the support bracket 16 is mounted by embedding enlarged anchor head 17 in the polymer prior to its being cured. This enables the shank 19 to extend from the central back portion of the mirror so that the spherical ball 16 serves for swivel mounting the mirror.

Figures 4, 5:
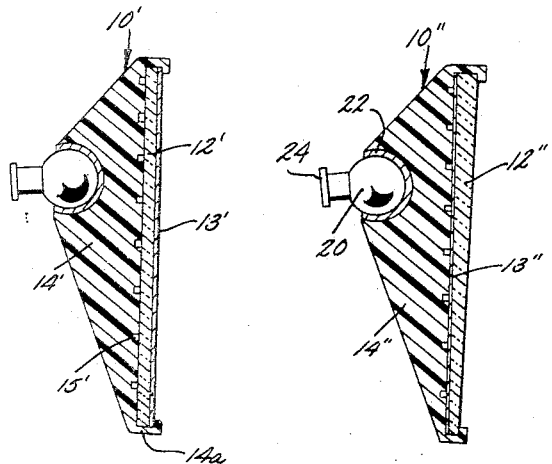
FIG. 4 is a sectional view of a second, slightly modified form of the novel mirror.
FIG. 5 is a sectional view of a third further slightly modified form of the novel mirror.

The entire periphery of the glass may be encompassed by the resin so that the glass plate is not only bonded to the polymer but is actually encased or embedded therein as shown in FIGS. 4 and 5. In FIG. 4, the modified assembly 10' includes a glass plate 12' with a front surface reflective coating 13'. The back surface of the planar type plate is bonded to polymeric support 14', preferably with an adhesive coat which also is filled into elongated grooves 15' along the back face of the glass.

The peripheral edge of the polymer overlaps the peripheral edge of the glass at 14a, and even a small front edge portion as shown in FIG. 4, to tightly retain the glass plate. This special overlap not only achieves structural stability and aesthetic attractiveness, but also greatly enhances the safety characteristics of the mirror assembly since all edges of the glass are completely enclosed in a plastic material which still has some "give" even in its solid state, and has no cutting characteristics. Therefore, the vehicle passengers are protected from being cut or sliced by the edges of the glass plate.

Another alternative embodiment 10" is shown in FIG. 5. In this structure, the glass plate 12" has a second surface reflective coating 13" and a prismatic type structure to form a day-night prism. In this instance again, backing 14" is bonded securely to the back plate of the mirror, and encompasses the peripheral edge of the prismatic element for support thereof.

A modified type bracket is shown in the structures of FIGS. 4 and 5. Namely, it comprises a spherical ball 20 which is retained within a socket 22 that is slightly greater than semispherical to receive the ball in a snap-in action. Preferably, a liner of metal or the like is formed in this pocket to reinforce it as shown in FIG. 5. The mounting shank 24 thus projects rearwardly from the back of the mirror for fixed attachment to a support. As a result of this concept, a completely different type of rearview mirror assembly, having excellent safety qualities, is achieved. The design factors which are possible with the mirror are practically endless since the periphery of the glass plate is not limited to a particular configuration which will enable it to be crimped inside of a metallic casing. Rather, the configuration of the glass plate may be varied tremendously.

In some forms of the invention, the glass plate will be bonded directly to the polymer itself at the time of curing the polymer. In other instances, the glass plate may be adhered to the polymer with an adhesive agent.

We claim:

1. A vehicular rearview mirror assembly comprising: a thin glass plate having a reflective surface coating thereon; said glass plate having a crystallized skin with a negative thermal expansion and being under substantial compression, and an interior with a positive thermal expansion and being under tension, so that said plate has high strength and flexibility even when bent through a substantial arc; a polymeric, non-metallic backing support body adhesively secured to the back face of said glass plate and supporting said glass plate; said body being resiliently, flexibly bendable with said glass plate upon impact, and having retention capacity for said glass plate by virtue of the adhesive securing of said body to said plate even with bending of said plate or breaking of said plate; and a mounting bracket projecting from the rear of said body.

2. A vehicular rearview mirror assembly comprising: a thin glass plate having a reflective surface coating thereon; said glass plate having surface layers under substantial compression and an interior under tension so that said plate has high strength and flexibility even when bent through a substantial arc; a polymeric non-metallic backing support body adhesively secured to the back face of said glass plate and supporting said plate in such a manner that in the event the glass is broken it will be firmly secured to backing support body; said body being resiliently, flexibly bendable with said glass plate upon impact, and having retention capacity for said glass plate even with bending of said plate or breaking of said plate; and a mounting bracket projecting from the rear of said body.

3. The assembly in claim 1 wherein said body has a peripheral retention flange overlapping and adhesively secured to the peripheral edge of said glass plate, and overlapping a small edge portion of said glass plate front face.

References Cited

UNITED STATES PATENTS

| | | | |
|---|---|---|---|
| 1,786,958 | 12/1930 | Oestnaes. | |
| 2,307,568 | 1/1943 | Colbert | 350—67 |
| 2,352,923 | 7/1944 | Turner | 350—310 X |
| 2,631,498 | 3/1953 | Barkley | 350—281 |
| 2,995,983 | 8/1961 | Davis | 248—467 X |
| 3,131,250 | 4/1964 | Ely | 248—467 X |
| 3,214,213 | 10/1965 | Hezler et al. | 65—30 X |

FOREIGN PATENTS

| | | |
|---|---|---|
| 809,433 | 12/1936 | France. |
| 1,073,755 | 3/1954 | France. |
| 708,315 | 5/1954 | Great Britain. |
| 736,382 | 9/1955 | Great Britain. |
| 880,999 | 11/1961 | Great Britain. |
| 437,381 | 11/1926 | Germany. |

DAVID SCHONBERG, *Primary Examiner.*

J. W. LEONARD, *Assistant Examiner.*

U.S. Cl. X.R.

248—467, 481; 350—67, 281